(12) United States Patent
Zang et al.

(10) Patent No.: US 8,682,293 B1
(45) Date of Patent: Mar. 25, 2014

(54) TELECOM FRAUD DETECTION USING SOCIAL PATTERN

(71) Applicant: Sprint Communications Company L.P., Overland Park, KS (US)

(72) Inventors: Hui Zang, Cupertino, CA (US); Travis E. Dawson, San Francisco, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/790,975

(22) Filed: Mar. 8, 2013

Related U.S. Application Data

(63) Continuation of application No. 12/706,864, filed on Feb. 17, 2010, now Pat. No. 8,396,451.

(51) Int. Cl.
*H04M 3/16* (2006.01)

(52) U.S. Cl.
USPC ....... 455/410; 455/411; 455/515; 379/114.14

(58) Field of Classification Search
USPC .................. 455/410, 411, 515; 379/114.14
See application file for complete search history.

(56) References Cited

U.S. PATENT DOCUMENTS

| | | | | |
|---|---|---|---|---|
| 5,655,004 A | * | 8/1997 | Holbrook | 455/411 |
| 6,208,720 B1 | * | 3/2001 | Curtis et al. | 379/114.14 |
| 7,236,954 B1 | * | 6/2007 | Marchand et al. | 705/37 |
| 8,554,912 B1 | * | 10/2013 | Reeves et al. | 709/225 |
| 2003/0110385 A1 | * | 6/2003 | Golobrodsky et al. | 713/188 |
| 2011/0014939 A1 | * | 1/2011 | Ravishankar et al. | 455/515 |

* cited by examiner

*Primary Examiner* — David Q Nguyen

(57) ABSTRACT

Generating fraud indications related to communications devices. A fraud metric is calculated for known nonfraudulent users. A fraud metric is calculated for known fraudulent users. An initial value is selected for the threshold. The fraud metric is calculated for a third set of users. The users of the third set are classified as being fraudulent or nonfraudulent according to the threshold. A false positive rate is determined and compared to a maximum false positive rate. When the rate exceeds the maximum, then the threshold is raised and the process is repeated until the false positive rate does not exceed the maximum false positive rate. A false negative rate is determined and compared to a maximum false negative rate. When the false negative rate exceeds the maximum false negative rate, then the threshold is lowered and the process is repeated until the false negative rate does not exceed the maximum.

18 Claims, 4 Drawing Sheets

TELECOM FRAUD DETECTION USING SOCIAL PATTERN

CROSS-REFERENCE TO RELATED APPLICATIONS

This application is a continuation of U.S. application Ser. No. 12/706,864, filed Feb. 17, 2010, entitled "Telecom Fraud Detection Using Social Pattern," the entirety of which is incorporated herein by reference.

SUMMARY

Embodiments of the invention are defined by the claims below, not this summary. A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

At a high level, ways of detecting fraud in a telecommunications environment are provided. Differences in social patterns of fraudulent and nonfraudulent users are leveraged to detect likely fraudulent uses and fraudulent users.

In a first aspect, computer-readable media embody computer-executable instructions for performing a method of determining a threshold for generating fraud indications related to communications devices. The method includes calculating a fraud metric for each user in a first set of users who have previously been determined to be fraudulent, thereby obtaining a first distribution of fraud metrics. The fraud metric is calculated for each user in a second set of users who have previously been determined not to be fraudulent, thereby obtaining a second distribution of fraud metrics. A classification threshold is determined according to a predetermined policy, the first distribution of metrics, and the second distribution of metrics on the basis of specified criteria. The fraud metric is calculated for each user in a third set of users. The fraud metric for each user in the third set of users is compared to the classification threshold. A tentative classification is generated for each user in the third set of users. A user is classified as fraudulent if the fraud metric exceeds said threshold and nonfraudulent if the fraud metric does not exceed the threshold. Feedback is obtained for said tentative classifications. The feedback includes one or more of a false positive rate and a false negative rate. Adjustments are made to the threshold in response to the feedback. The adjustments include one or more of lowering the threshold when the false positive rate exceeds a maximum permissible false positive rate, and raising the threshold when the false negative rate exceeds a maximum permissible false negative rate. The steps of calculating the metric for each user in the third set of users, comparing the metric to the threshold as adjusted, generating a tentative classification for each user according to the results of said comparison, obtaining feedback for said tentative classifications, and making adjustments to the threshold, are repeated until the threshold simultaneously satisfies the maximum permissible false positive rate and the maximum permissible false negative rate.

In a second aspect, computer-readable media embody computer-executable instructions for performing a method of determining a threshold for generating fraud indications related to communications devices. The method includes calculating a first distribution of values for a fraud metric for a set of users previously known to be nonfraudulent. A second distribution of values is calculated for the fraud metric for a set of users previously known to be fraudulent. An initial value is selected for the threshold. The fraud metric is calculated for a third set of users. The users of the third set are classified as being fraudulent or nonfraudulent according to the threshold. A false positive rate is determined for the classifying of the users of the third set. The false positive rate is compared to a maximum false positive rate. When the false positive rate exceeds the maximum false positive rate, then the threshold is raised, and the classifying, the determining the false positive rate, the comparing the false positive rate to a maximum false positive rate, and the raising are repeated until the false positive rate does not exceed the maximum false positive rate. When the false positive rate does not exceed the maximum false positive rate, then a false negative rate is determined for the classifying of the users of the third set. The false negative rate is compared to a maximum false negative rate. When the false negative rate exceeds the maximum false negative rate, then the threshold is lowered and the steps of classifying, determining the false negative rate, comparing the false negative rate to a maximum false negative rate, and lowering are repeated until the false negative rate does not exceed the maximum false negative rate.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

BTS Base Transceiver Station
SMS Simple Message Service

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media include media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
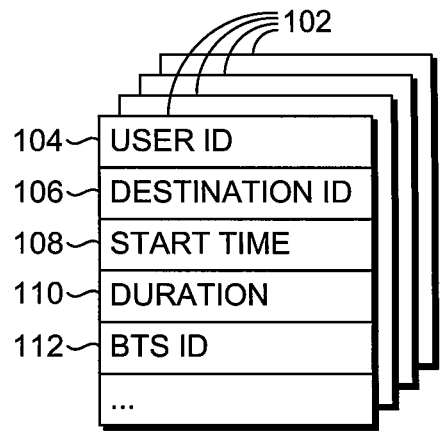
FIG. 1 depicts a set of communication records and the fields contained in each communication record in accordance with one embodiment of the present invention.

Turning now to FIG. 1, an illustrative set of communication records 102 is presented. Each of communication records corresponds to a single communication. In one embodiment, these communications are exclusively voice calls. In another embodiment, these communications are SMS messages. In yet another embodiment, these communications include voice, SMS, and data communications. In one embodiment of the present invention, each communication record 102 contains an identifier for a user 104 associated with the communication and one or more fields describing various features of the communication. In one variant of this embodiment, these fields include a destination identifier 106 corresponding the other endpoint of the communication (i.e. the destination of an outgoing call or the origination of an incoming call), a start time 108 representing the time at which the communication was initiated, a duration 110 for the communication, and a BTS identifier 112 corresponding to the base transceiver station with which the mobile device communicated during the communication. Other embodiments may include more, fewer, or different fields in each communication record 102 without departing from the scope of the claims below.

Figure 2:
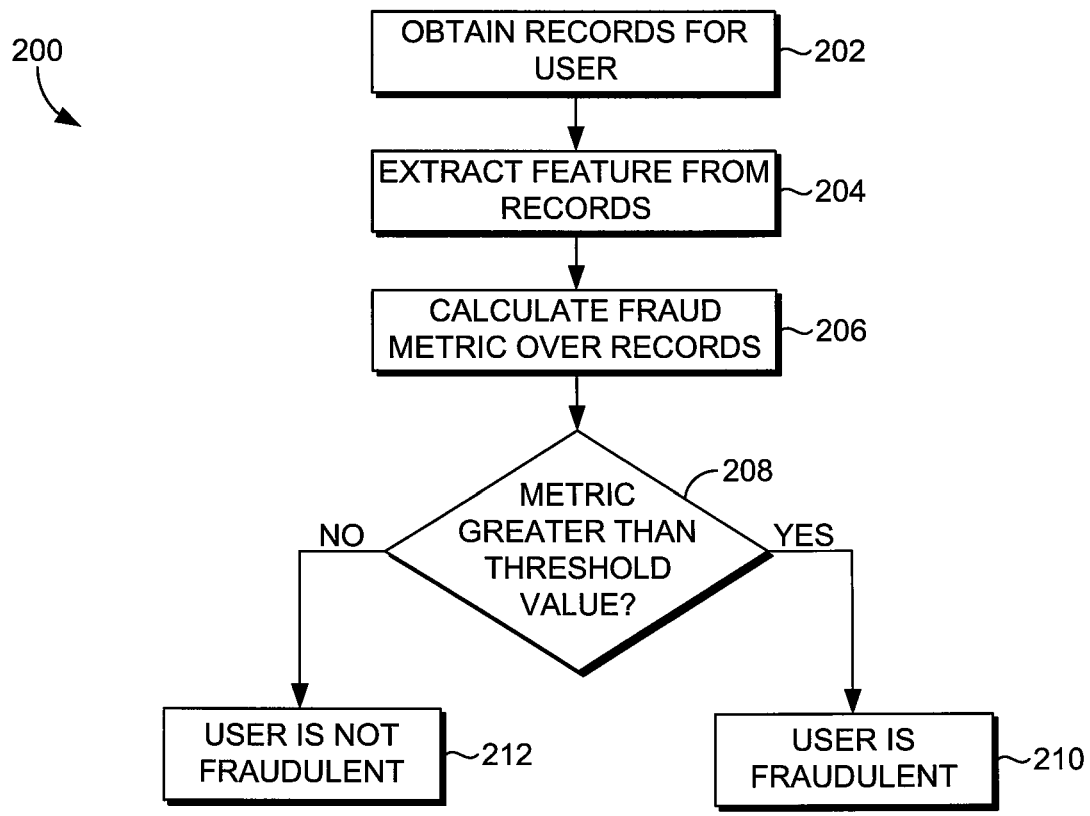
FIG. 2 depicts a flow diagram for a method for classifying users as fraudulent or nonfraudulent in accordance with one embodiment of the present invention.

Turning now to FIG. 2, a flow diagram is presented for a method of classifying a user as fraudulent or nonfraudulent in accordance with one embodiment of the present invention and referenced generally by the numeral 200. In step 202, all the communications records 102 for the user to be classified are extracted for the set of all communications records 102 for a fixed time period. In one embodiment, this time interval is a single day. In another embodiment, it is an entire billing period.

In step 204, a feature is extracted from each communications record 102 and categorized as belonging to one of a plurality of categories. In an illustrative example, the feature is the duration of the call, and the categories are one-minute intervals; in another example, the feature is the destination identifier, and the categories are the distinct destination identifiers. Other features and other ways of assigning features to distinct categories are possible without departing from the scope of the present invention.

In step 206, a fraud metric is calculated over the features extracted in step 204. A variety of metrics are possible; in one embodiment, the metric is the number of distinct destination identifiers. In a more complex embodiment, the metric is the Shannon entropy (or similar) of the fraction of calls made to each destination identifier. This metric, denoted H(A) for a set of records A, is calculated in one embodiment as:

$$H(A) = -\sum_{i=1}^{m} \left[ \left( \frac{|B_i|}{|A|} \right) \log_2 \left( \frac{|B_i|}{|A|} \right) \right],$$

where $B_i$ is the set of all call records with destination identifier i of m, and in particular, $\Sigma_{i=1}^{m} |B_i| = |A|$. In yet another embodiment, the metric is the Shannon entropy of the fraction of total call time spent connected to each distinct destination identifier, calculated as:

$$H(A) = -\sum_{i=1}^{m} \left[ \left( \frac{\sum_{j=1}^{|B_i|} t(b_{ij})}{\sum_{a \in A} t(a)} \right) \log_2 \left( \frac{\sum_{j=1}^{|B_i|} t(b_{ij})}{\sum_{a \in A} t(a)} \right) \right],$$

where $b_{ij}$ is the $j^{th}$ call to destination identifier i of m, t(x) is the duration of call x, $\Sigma_{i=1}^{m} |B_i| = |A|$ as above, and $B_i = \{b_{ij}\}_j$.

Other fraud metrics are contemplated, and each of these possible metrics can be calculated over any of the features in communication records 102 without departing from the scope of the claims below.

Once the fraud metric is calculated for the user to be categorized in step 206, it is compared with a threshold value in step 208. If the calculated value of the metric is greater than the threshold value, the user is categorized as fraudulent in step 210; otherwise the user is categorized as nonfraudulent in step 212.

Figure 3:
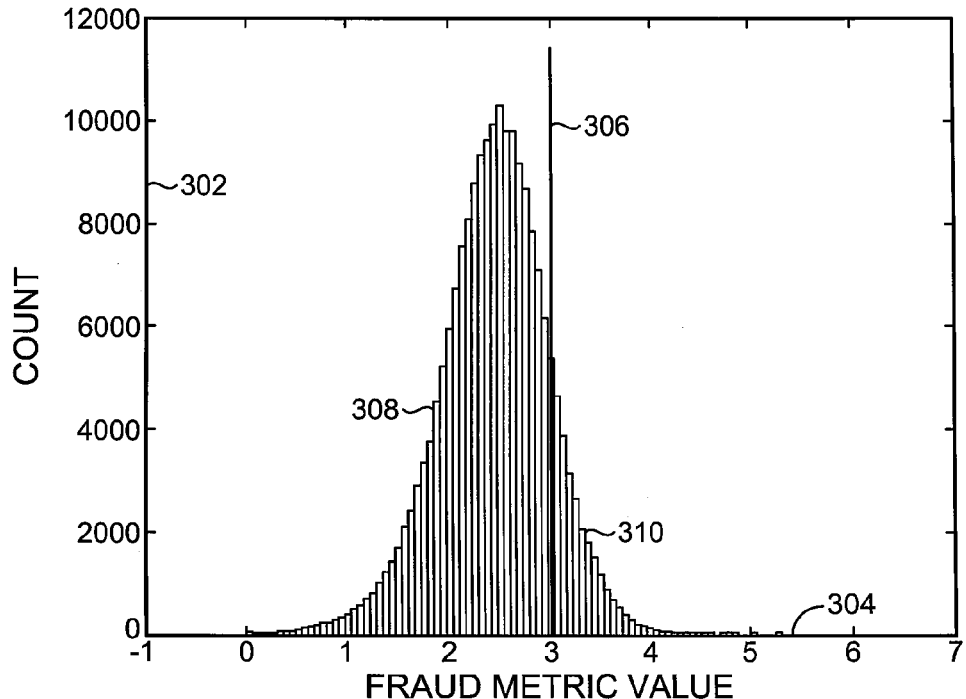
FIG. 3 depicts a typical histogram for the distribution of values taken on by the fraud metric for a set of users in accordance with one embodiment of the present invention.

The choice of threshold value used in step 208 influences the accuracy of classifying users. The values of the fraud metrics can be distributed according to an approximately normal distribution. FIG. 3 shows a histogram of the number 302 of users whose fraud metric value 304 falls into each bucket of a certain size for an exemplary data set. Also included is a visual depiction of the threshold value 306. Threshold value 306 partitions the users in the data set into a set of users classified as nonfraudulent 308 and a set of users classified as fraudulent 310. Increasing threshold value 306 will classify fewer users as fraudulent, while decreasing it will classify more users as fraudulent.

Figure 4:
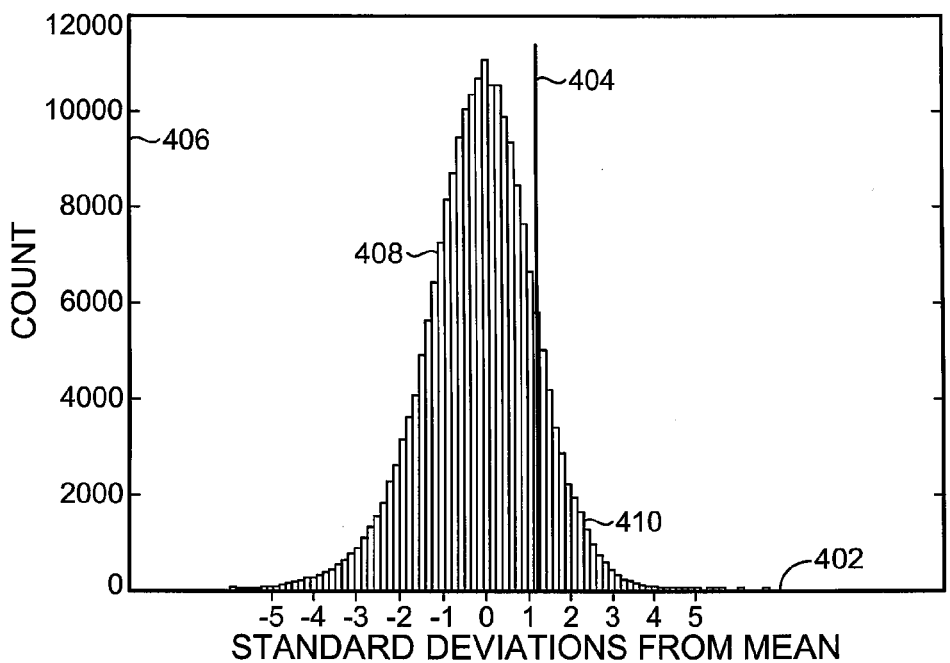
FIG. 4 depicts a typical histogram for the distance, in terms of standard deviations, of the distance from the mean value of the fraud metric for a set of users in accordance with another embodiment of the present invention.

Turning now to FIG. 4, an alternate embodiment of method 200 is illustrated. For this embodiment, consider that a metric, such as the number of distinct destination identifiers, may increase for the general population on a holiday such as Christmas. However, the normal shape of the distribution will remain unchanged, though its mean and standard-deviation parameters may change. In embodied shown in FIG. 4, the values of the metric 402 and the threshold value 404 are not expressed in terms of an absolute value of the fraud metric (such as "calls to 30 distinct numbers"); but rather, in terms of the distance, in standard deviation values, from the mean value of the metric over all calculations for the same time period (such as "three standard deviations greater than the mean"). FIG. 4 also has several components which correspond to those in FIG. 3: count 406 corresponds to count 302, and the set of users classified as not-fraudulent 408 corresponds to set of users 308, while the set of users classified as fraudulent 410 corresponds to the set of users 310.

Figure 5:
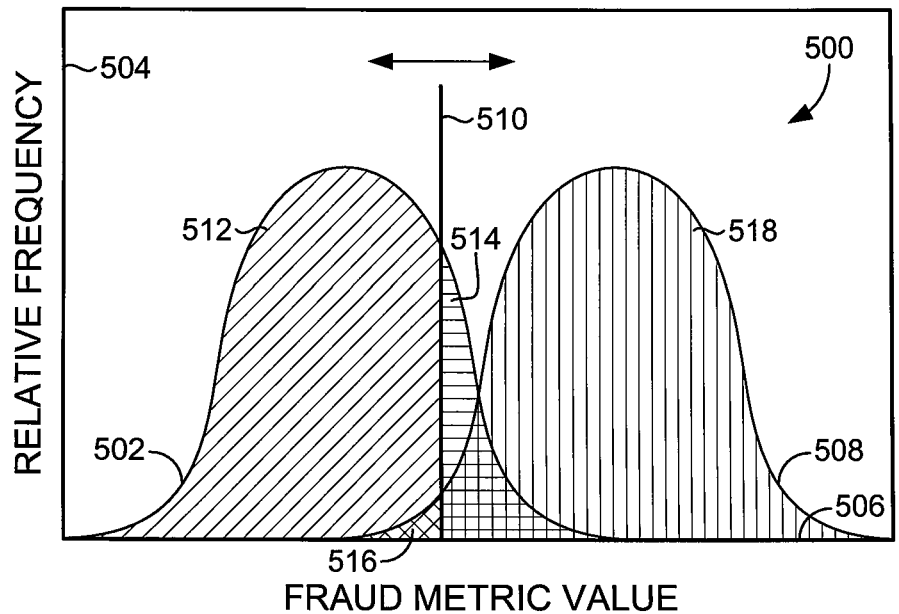
FIG. 5 depicts the different distributions of one fraud metric for fraudulent and nonfraudulent users in accordance with an embodiment of the present invention.

Turning now to FIG. 5, an illustration of the tradeoff between the false negative rate and the false positive rate is presented and referenced generally by the numeral 500. The first curve 502 plots relative frequency 504 of fraud metric values 506 for the population of nonfraudulent users, and the second curve 508 represents the distribution of fraud metric values for fraudulent users for an exemplary data set. Note that fraud metric value 506 corresponds to fraud metric value 304. Because these distributions can have significant overlap, generally, no selection of the threshold value 510 can classify users as fraudulent or nonfraudulent with perfect accuracy. Threshold 510 corresponds to threshold 306 and threshold 404.

Threshold value 510 divides the populations of users into four regions. Region 512 represents those nonfraudulent users correctly classified as nonfraudulent. Region 514 represents those nonfraudulent users incorrectly classified as fraudulent (i.e., false positives). Region 516 represents those fraudulent users incorrectly classified as nonfraudulent (i.e., false negatives). Region 518 represents those fraudulent users correctly classified as fraudulent. Thus, increasing threshold 510 (i.e., moving it to the right) has the effect of increasing the size of region 512 at the expense of region 514, and increasing the size of region 516 at the expense of region 518; decreasing the threshold (i.e., moving it to the left) has the opposite effects.

Figure 6:
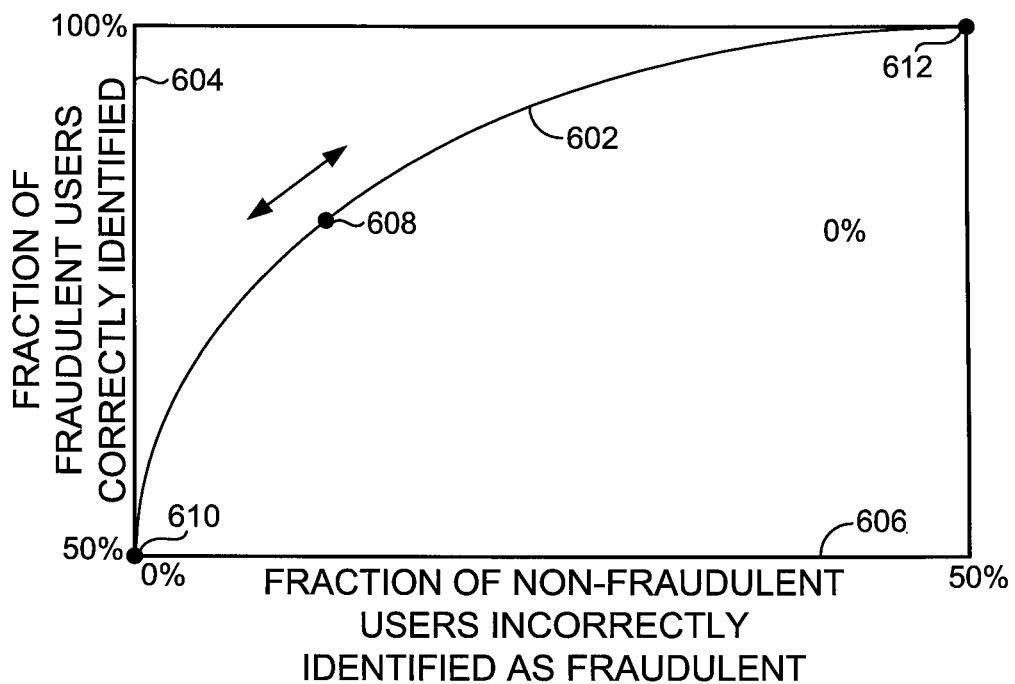
FIG. 6 graphically depicts the trade-off between the fraction of fraudulent users correctly identified as fraudulent and the fraction of nonfraudulent users mistakenly identified as fraudulent.

Turning now to FIG. 6, the tradeoff 500 is presented explicitly for the exemplary data set of FIG. 5. Curve 602 plots the fraction of fraudulent users correctly identified 604 (i.e., the size of region 518) against the fraction of nonfraudulent users incorrectly identified as fraudulent 606 (i.e., the size of region 514). Each point 608 on this curve corresponds to a particular value of threshold 510. Thus, in the extreme cases, point 610 corresponds to having a false positive rate of 0%, at the expense of correctly identifying only 50% of fraudulent users, and point 612 corresponds to correctly identifying every fraudulent user, at the cost of a 50% false positive rate. Point 608 corresponds to an intermediate value of the threshold, as in the case of threshold 306, threshold 404, or threshold 510. Of course, these figures are specific to the exemplary data set shown; other data sets will have their own extreme and optimum threshold values.

Figure 7:
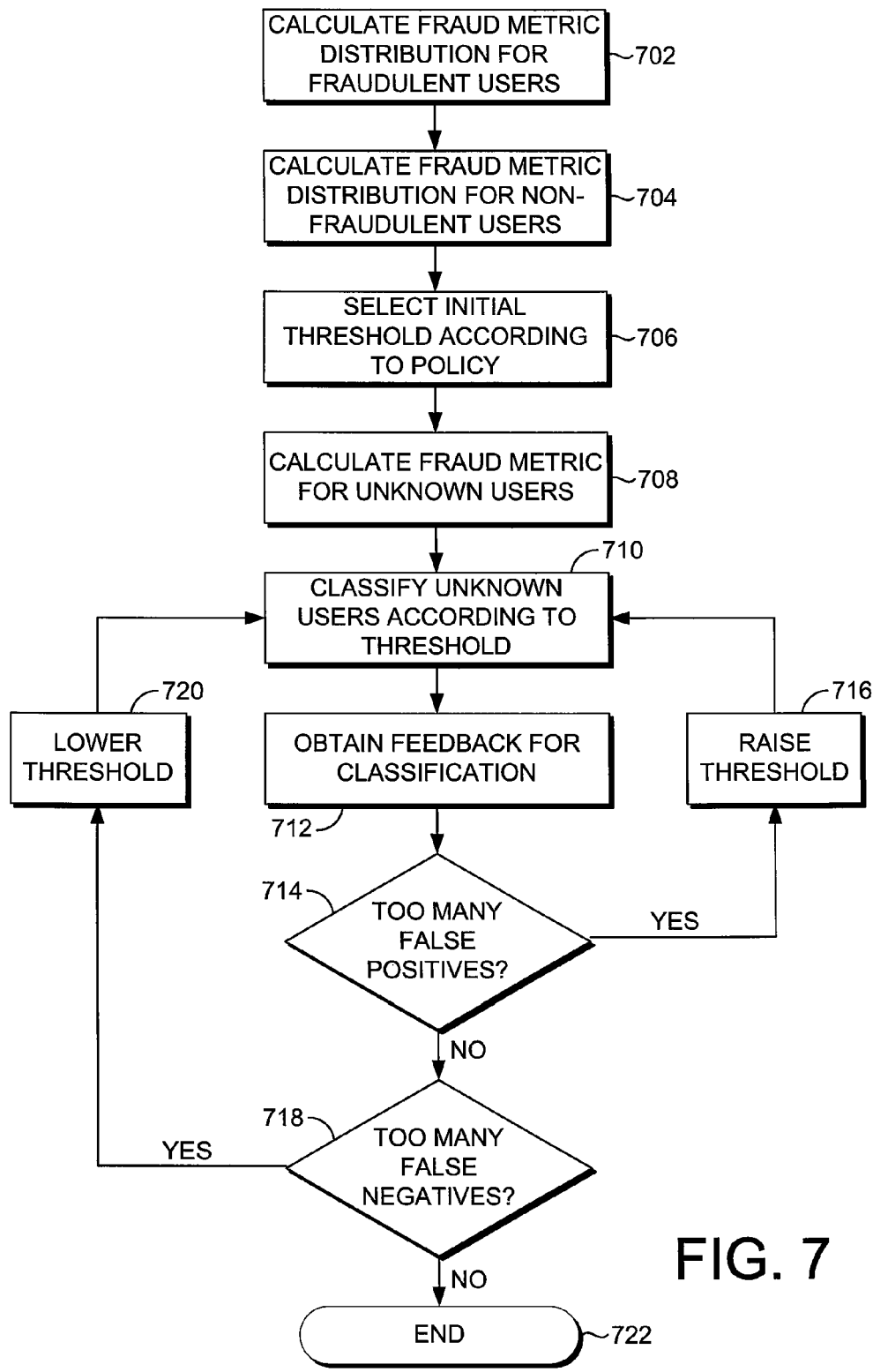
FIG. 7 depicts a flow diagram for a method for determining a threshold value of the fraud metric in accordance with one embodiment of the present invention.

Turning now to FIG. 7, an illustrative method for determining a threshold fraud metric value in accordance with the present invention is presented. In step 702, a first distribution of values for the fraud metric for a set of users known a priori to be nonfraudulent is calculated; this distribution corresponds to curve 502. In one embodiment, this set of users is obtained by manually screening a subset of all users for fraudulent behavior. In another embodiment, it is obtained by using historical records for which no fraud complaints were received.

In step 704, a second distribution of values for the fraud metric for a set of users known a priori to be fraudulent is calculated; this distribution corresponds to curve 508. In one embodiment, this set of users is obtained from the set of users who have complained of fraud on their accounts; in another embodiment, it is obtained from the set of users who have been detected as fraudulent by another screening system.

In step 706, an initial threshold is selected according to a heuristic policy. In one embodiment, the threshold is selected such that 95% of fraudulent users have a fraud metric value higher than the initial threshold. In another embodiment, it is selected such that 99% of nonfraudulent users have a fraud metric value lower than the initial threshold. Other heuristics are possible without departing from the scope of the claims below.

In step 708, a fraud metric is calculated for a third set of users who are not in the first set or the second set. In one embodiment, this set of users is not known to be fraudulent and not known to be nonfraudulent. In another embodiment, this third set of users was selected and removed from the first set and the second set before steps 702 and 704. In one variant of this embodiment, users selected from the first set and users selected from the second set are chosen in equal proportion. In another variant, users selected from the first set and users selected from the second set are chosen in proportion to the estimated proportion of users who are fraudulent and users who are nonfraudulent, respectively. In step 710, the users of the third set are then classified as being fraudulent or nonfraudulent according to the initial threshold selected in step 706.

In step 712, feedback is obtained for the classifications made in step 710. In one embodiment, this feedback is obtained by comparing the classifications made in step 710 to the set from which the users were selected, and generating a confusion matrix from the results.

In step 714, the false positive rate is extracted from the confusion matrix generated in step 712 and compared to a maximum false positive rate. If the false positive rate exceeds the maximum false positive rate, the threshold is raised in step 716 and steps 710 et seq. are repeated. In one embodiment, the steps of raising the threshold and repeating are only performed if the false negative rate is not above a permissible false negative rate.

Otherwise, in step 718, the false negative rate is extracted from the confusion matrix and compared to a maximum false negative rate. If the false negative rate exceeds a maximum false negative rate, the threshold is lowered in step 720 and steps 710 et seq. are repeated. In one embodiment, the steps of lowering the threshold and repeating are only performed if the false positive rate is not above a permissible false positive rate. In one embodiment, if it is determined that no threshold can simultaneously satisfy the maximum false positive rate and the maximum false negative rate, one or both of the maximum false positive rate and the maximum false negative rate are increased. In another embodiment, an alert is generated for manual intervention and adjustment of one or both of the maximum false positive rate and the maximum false negative rate.

Once a threshold is found which simultaneously satisfies the maximum false positive rate and the maximum false negative rate, the classifications are finalized in step 722. In one embodiment, the method terminates at step 722. In another embodiment, the final threshold is used as the initial threshold determined in step 706, and the method continues to classify another set of users beginning from that point.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Computer-readable media having computer-executable instructions embodied thereon that, when executed by one or more processors, perform a method of determining a threshold for generating fraud indications related to communications devices, the method comprising:
   calculating a fraud metric for each user in a first set of users who have previously been determined to be fraudulent, thereby obtaining a first distribution of fraud metrics;
   calculating the fraud metric for each user in a second set of users who have previously been determined not to be fraudulent, thereby obtaining a second distribution of fraud metrics;
   determining a classification threshold according to a predetermined policy, the first distribution of metrics, and the second distribution of metrics on the basis of specified criteria;
   calculating the fraud metric for each user in a third set of users;
   comparing the fraud metric for each user in the third set of users to the classification threshold;
   generating a tentative classification for each user in the third set of users, wherein said user is classified as fraudulent if said fraud metric exceeds said threshold and nonfraudulent if said fraud metric does not exceed said threshold;
   obtaining feedback for said tentative classifications, said feedback including one or more of a false positive rate and a false negative rate;
   making adjustments to said threshold in response to said feedback, said adjustments including one or more of
   (A) lowering the threshold when said false positive rate exceeds a maximum permissible false positive rate, and
   (B) raising the threshold when said false negative rate exceeds a maximum permissible false negative rate;
   repeating the steps of calculating the metric for each user in the third set of users, comparing the metric to the threshold as adjusted, generating a tentative classification for each user according to the results of said comparison, obtaining feedback for said tentative classifications, and making adjustments to the threshold, until the threshold simultaneously satisfies the maximum permissible false positive rate and the maximum permissible false negative rate.

2. The media of claim 1, wherein said specified criteria include one or more of:
   a minimum fraction of known fraudulent users to be correctly identified as fraudulent; and
   a minimum fraction of known nonfraudulent users to be correctly identified as nonfraudulent.

3. The media of claim 1, wherein said device is a wireless telecommunications device.

4. The media of claim 3, wherein the fraud metrics for the first set of users, the second set of users, and the third set of users are calculated based on communication records for the first set of users, the second set of users, and the third set of users.

5. The media of claim 4, wherein each of said communication records includes a destination identifier, and the metric calculated over said records is Shannon entropy of one of the following:
   a fraction of communications records by said user, which records include each distinct destination identifier; and
   a fraction of a total duration over all communications records by said user associated with each distinct destination identifier.

6. The media of claim 4, wherein:
   each of said communications records includes a time at which a communication was initiated; and
   the metric calculated over said records is Shannon entropy of a fraction of communications by said user falling within each of a plurality of time intervals.

7. The media of claim 4, wherein:
   each of said communications records includes a duration for a communication; and
   the metric calculated over said records is Shannon entropy of a fraction of communications by said user falling within each of a plurality of duration ranges.

8. The media of claim 4, wherein:
   each of said communications records includes a base transceiver station from which a communication was initiated; and
   the metric calculated over said records is Shannon entropy of a fraction of communications by said user initiated from each base transceiver station.

9. The media of claim 4, wherein the media further includes eliminating any communication record that is not a well-formed record of a voice call originated by said user prior to calculating the fraud metric.

10. Computer-readable media having computer-executable instructions embodied thereon that, when executed by one or more processors, perform a method of determining a threshold for generating fraud indications related to communications devices, the method comprising:
    calculating a first distribution of values for a fraud metric for a set of users previously known to be nonfraudulent;
    calculating a second distribution of values for the fraud metric for a set of users previously known to be fraudulent;
    selecting an initial value for the threshold;
    calculating the fraud metric for a third set of users;
    classifying the users of the third set as being fraudulent or nonfraudulent according to the threshold;
    determining a false positive rate for the classifying of the users of the third set;
    comparing the false positive rate to a maximum false positive rate;
    when the false positive rate exceeds the maximum false positive rate, then
    (A) raising the threshold, and
    (B) repeating the classifying, the determining the false positive rate, the comparing the false positive rate to a maximum false positive rate, and the raising until the false positive rate does not exceed the maximum false positive rate;
    when the false positive rate does not exceed the maximum false positive rate, then determining a false negative rate for the classifying of the users of the third set;
    comparing the false negative rate to a maximum false negative rate; and
    when the false negative rate exceeds the maximum false negative rate, then
    (A) lowering the threshold, and
    (B) repeating the classifying, the determining the false negative rate, the comparing the false negative rate to a maximum false negative rate, and the lowering until the false negative rate does not exceed the maximum false negative rate.

11. The media of claim 10, wherein said threshold is expressed as an absolute value of the metric.

12. The media of claim 10, wherein said threshold is expressed as a number of standard deviations away from a mean value of the metric over all calculations of the metric for a given time interval.

13. The media of claim 10, wherein the fraud metrics for the first set of users, the second set of users, and the third set of users are calculated based on communication records for the first set of users, the second set of users, and the third set of users.

14. The media of claim 13, wherein:
each communication record includes a field corresponding to a destination identifier for a communication; and
the fraud metric is calculated over a fraction of communications records for a given user with each distinct destination identifier.

15. The media of claim 13, wherein:
each communication record includes a time at which a communication was initiated; and
the fraud metric is calculated over a fraction of communications for a given user falling within each of a plurality of time intervals.

16. The media of claim 13, wherein:
each communication record includes a field corresponding to a duration of the communication; and
the fraud metric is calculated over a fraction of communication records for a given user falling within each of a plurality of duration ranges.

17. The media of claim 13, wherein:
each communication record includes a field corresponding to a base transceiver station from which the communication was initiated; and
the fraud metric is calculated over a fraction of communications for a given user initiated from each base transceiver station.

18. The media of claim 10, wherein the fraud metric calculated is Shannon entropy.

* * * * *